United States Patent
Boucherie

(10) Patent No.: US 7,559,611 B2
(45) Date of Patent: Jul. 14, 2009

(54) DEVICE FOR COMPENSATING THE VIBRATIONS CAUSED BY THE MOVEMENTS OF A TOOL OF A BRUSH MANUFACTURING MACHINE

(75) Inventor: Bart Gerard Boucherie, Izegem (BE)

(73) Assignee: Firma G.B. Boucherie, naamloze vennootschap, Izegem (BE)

( * ) Notice: Subject to any disclaimer, the term of this patent is extended or adjusted under 35 U.S.C. 154(b) by 721 days.

(21) Appl. No.: 11/049,719

(22) Filed: Feb. 4, 2005

(65) Prior Publication Data

US 2005/0173967 A1     Aug. 11, 2005

(30) Foreign Application Priority Data

Feb. 6, 2004     (BE) ................................ 2004/0066

(51) Int. Cl.
*A46D 3/04*     (2006.01)
*A46D 3/08*     (2006.01)

(52) U.S. Cl. ............................... 300/8; 300/2; 188/378; 74/604

(58) Field of Classification Search ................. 300/2–8; 74/567, 569, 572.4, 594.5, 603, 604; 112/220; 188/378–380
See application file for complete search history.

(56) References Cited

U.S. PATENT DOCUMENTS

| 1,857,099 | A | * | 5/1932 | Lieberknecht | 66/82 R |
| 1,902,113 | A | * | 3/1933 | Zahoransky | 300/8 |
| 2,198,348 | A | | 4/1940 | Porter | |
| 2,796,149 | A | * | 6/1957 | Wallin | 188/380 |
| 2,883,952 | A | * | 4/1959 | Meloy, Jr. et al. | 112/221 |
| 3,065,469 | A | * | 11/1962 | Parker | 227/85 |
| 3,230,015 | A | * | 1/1966 | Iasillo | 300/5 |
| 3,371,554 | A | | 3/1968 | McCray et al. | |
| 4,439,003 | A | | 3/1984 | Roth | |
| 5,758,615 | A | * | 6/1998 | Kreuter | 123/192.2 |
| 6,029,541 | A | * | 2/2000 | Schrick et al. | 74/604 |

FOREIGN PATENT DOCUMENTS

| DE | 1 012 285 | 7/1957 |
| GB | 337466 | 11/1930 |

* cited by examiner

*Primary Examiner*—Mark Spisich
(74) *Attorney, Agent, or Firm*—Bacon & Thomas, PLLC

(57) ABSTRACT

Device for compensating the vibrations caused by the movements of a tool of a brush manufacturing machine, more particularly of a tool (1) having at least one slide (2) which is provided in a first guide (3) such that is can move to and fro and which is provided with driving device (4) for this slide, wherein the device includes a compensating mass (16) and of a moving device (17) to move this compensating mass (16) in the opposite sense of the movement of the slide (2).

3 Claims, 9 Drawing Sheets

DEVICE FOR COMPENSATING THE VIBRATIONS CAUSED BY THE MOVEMENTS OF A TOOL OF A BRUSH MANUFACTURING MACHINE

BACKGROUND OF THE INVENTION

1. Field of the Invention

Device for compensating the vibrations caused by the movements of a tool of a brush manufacturing machine, more particularly of a tool having at least one slide which is provided in a guide such that it can move according to a particular aimed law of motion.

It is known that such tools are usually driven by means of a cam and lever mechanism, whereby the shape of the cam determines the above-mentioned law of motion of the slide.

Due to the irregular movements of the slide, vibrations are generated during the operation of the brush manufacturing machine, which are of course harmful to the machine and to the finishing quality of the brushes.

These vibrations moreover interfere with the production rhythm of the machine concerned, and thus also with the production capacity of the machine, since, as of a certain driving speed of said machine, the above-mentioned vibrations could cause cracks, as a consequence of which said driving speed is limited to a certain extent.

2. Discussion of the Related-Art

It is already known that the above-mentioned vibrations can be partially absorbed by applying a counterweight which is provided eccentrically on the main drive shaft of the brush machine.

This counterweight compensates the generated vibrations only to a limited extent, as a result of which the driving speed of the brush machine still has to be drastically limited in order to avoid cracks.

SUMMARY OF THE INVENTION

The present invention aims to remedy one or several of the above-mentioned and other disadvantages by providing a device which can compensate the vibrations, caused by the movements of the tool of the brush machine, better than it has been the case until now, as a result of which the brush machine can be driven at higher speeds, and the production capacity of the machine can thus be raised.

Moreover, by reducing the vibrations, the life of the tool will be increased and the overhauls of the machine can be deferred for longer periods.

To this end, the invention concerns a device for compensating the vibrations caused by the movements of a tool of a brush manufacturing machine, more particularly of a tool having at least one slide which has been provided in a guide such that it can move to and fro and which is provided with driving means for this slide, whereby the device mainly consists of a compensating mass and of means to move this compensating mass (a mass moving device) in the opposite sense of the movement of the slide.

BRIEF DESCRIPTION OF THE DRAWINGS

In order to better explain the characteristics of the invention, the following preferred embodiments of devices according to the invention for compensating vibrations caused by the movements of a tool of a brush manufacturing machine are given as an example only without being limitative in any way, with reference to the accompanying drawings, in which.

DESCRIPTION OF SOME PREFERRED EMBODIMENTS

Figure 1:
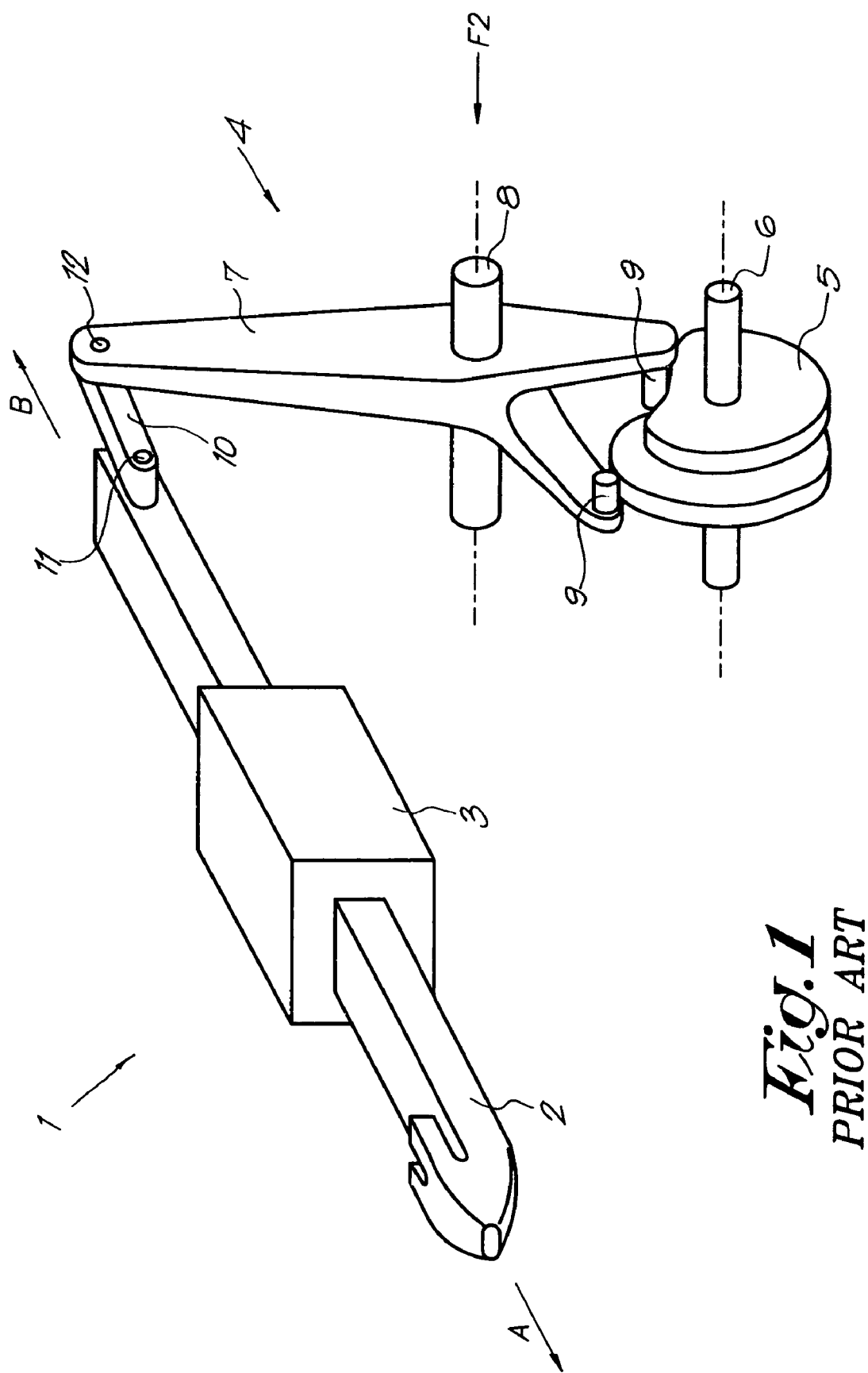
FIG. 1 schematically represents a tool having one slide, of a known brush manufacturing machine, seen in perspective.
Figure 2:
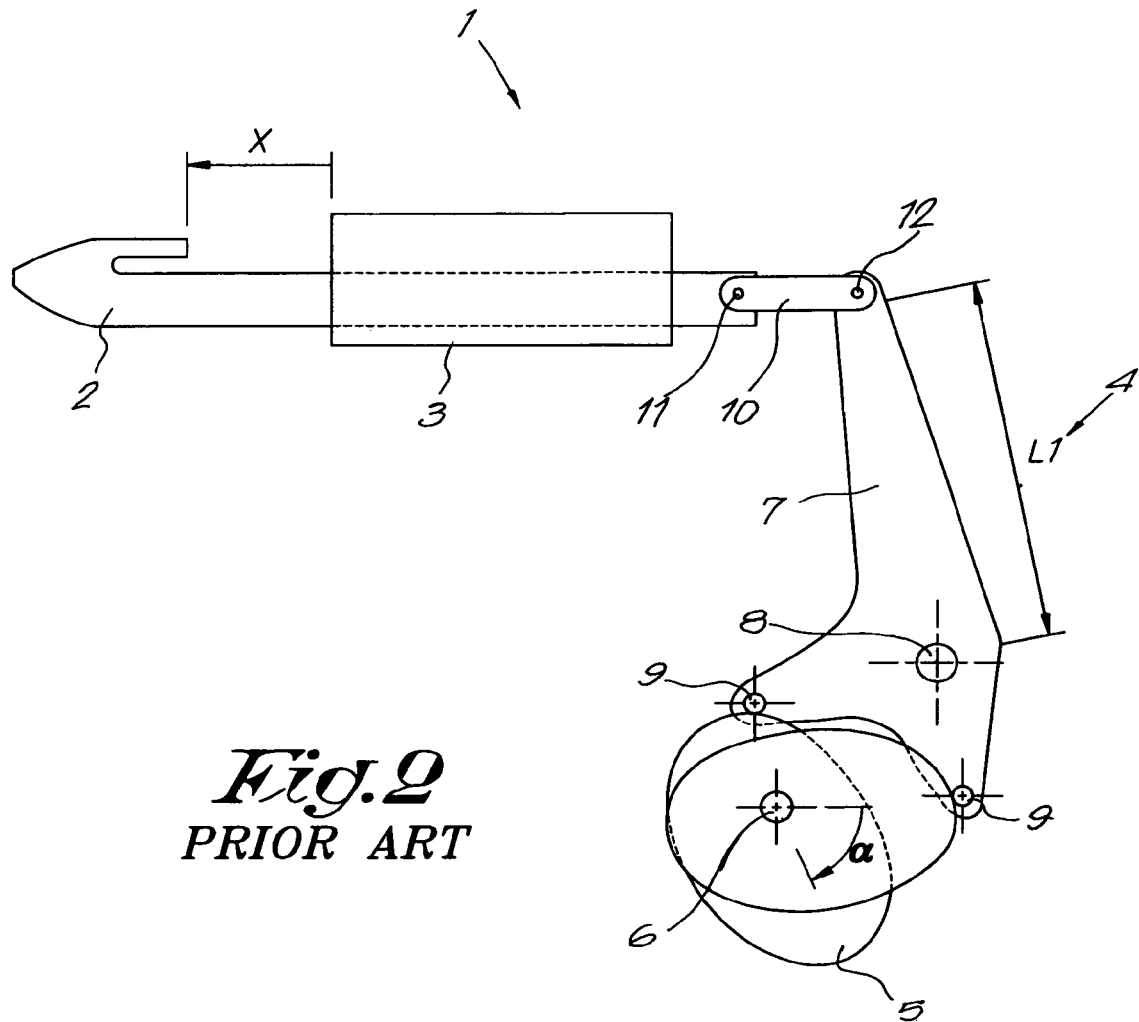
FIG. 2 represents a view according to arrow F2 in FIG. 1.

FIGS. 1 and 2 represent a tool 1 which is part of a known brush manufacturing machine.

The tool 1 is in this case a filling tool which is used to apply bundles of fibers in pre-drilled holes of a brush body, and which is mainly formed of a slide 2 which can be moved to and fro according to the arrows A and B in a fist guide 3 and which is provided with driving means 4 for this slide 2.

The driving means 4 are formed of a cam and lever mechanism which mainly consists of a cam 5, in this case a double cam 5, which is provided on a driving shaft 6, and of a lever 7 having a length L1 which is provided on a hinge pin 8 such that it can freely rotate, and which makes contact with the above-mentioned cam 5 by means of catch pins 9.

The lever 7 is directed mainly crosswise to the direction of movement A/B of the above-mentioned slide 2 and is connected with one far end to the slide 2 concerned by means of a rod transmission with a rod 10 which is hinge-mounted to the slide 2 with one far end by means of a first spindle 11, and which is hinge-mounted to the lever 7 with its other far end by means of a second spindle 12.

In order to drive the tool 1, the driving shaft 6 is driven at a certain rotational speed, such that, in the known manner, a certain desired movement is transmitted by the cam and lever mechanism 5-7 onto the slide 2, whereby the law of motion of the slide 2 is determined by the contour form of the cam 5.

Figure 3:
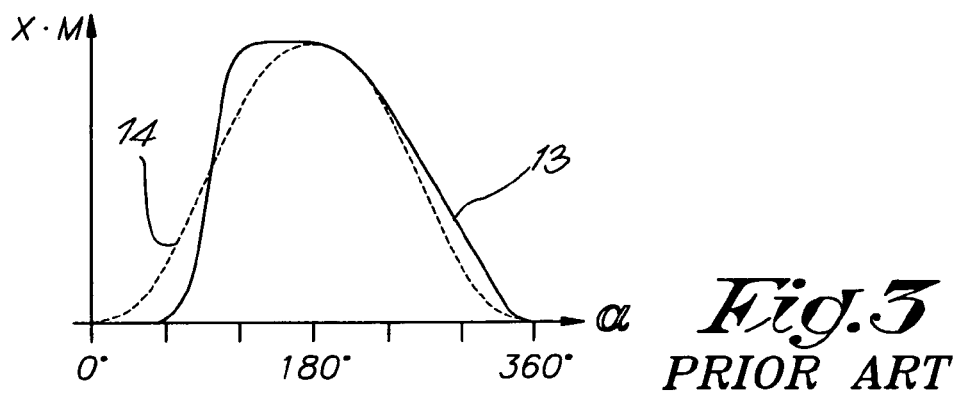
FIG. 3 represents a motion curve of the tool from FIG. 1.

FIG. 3 represents an example of such a motion curve 13, whereby α is the angular displacement of the driving shaft 6 and (X.M) is the corresponding displacement of the slide 2 in relation to the guide 3, multiplied by the mass M of the slide 2.

For a professional, it will be ear from this curve that the slide 2 is subjected to large variable accelerations in the direction of the slide motion A, B, and thus to large variable forces of inertia which are transmitted to the tool 1.

These variable forces of inertia cause vibrations which are all the greater as the driving speed of the driving shaft 6 is greater and as the mass M of the slide 2 is greater.

A known technique for reducing these generated vibrations is to apply an eccentric counterweight on the main shaft of the brush machine, or on the driving shaft 6 for example, which counterweight rotates along with the shaft concerned.

Such a counterweight carries out a sinusoidal movement in the direction of movement A, B, whose motion curve 14 is represented by means of dashed line in FIG. 3.

As is ear from FIG. 3, the shape of the motion curve 14 of the counterweight comes somewhat close to the shape of the motion curve 13 of the slide 2, such that this counterweight can be used to partially balance the vibrations caused by the slide 2.

As the motion curves 13 and 14 are still early different, it will not be possible to compensate the vibrations of the slide entirely with this technique. Moreover, additional vibrations are generated by the drive of said counterweight in a direction which is perpendicular to the above-mentioned direction of movement A, B of the slide 2.

Figure 4:
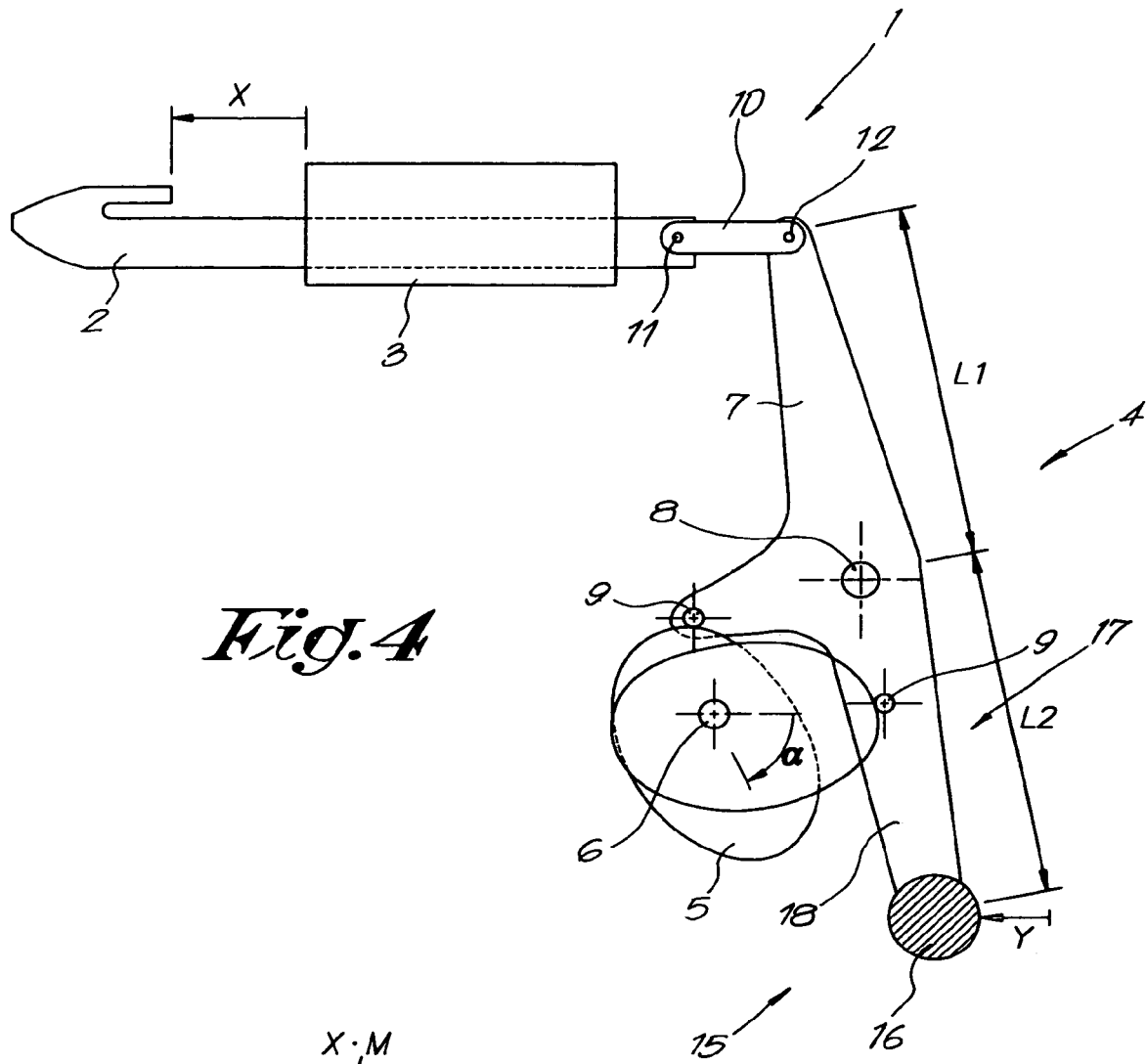
FIG. 4 represents a tool similar to that of FIG. 2, but whereby this tool is equipped with a device according to the invention for compensating the vibrations caused by the movements of the tool.

FIG. 4 represents the above-described tool 1, whereby the tool is provided in this case with a device 15 according to the invention for compensating the vibrations caused by the movements of the slide 2.

The device 15 for compensating the vibrations mainly consists of a compensating mass 16 having a mass N and of mass moving device or means 17 to move this compensating mass 16 in the opposite sense of the movement of the slide 2.

In the embodiment of FIG. 4, said means 17 are formed of the driving means 4 of the slide 2, formed of the cam and lever mechanism 5-7, whereby the above-mentioned lever 7 is extended on the other side of the hinge pin 8 with a part 18 having a length L2, and the above-mentioned compensating mass 16 is fixed to the free end of this extended part 18.

Preferably, the lever 7 and the compensating mass 16 are dimensioned such that the product of the length L2 of the extended part 18 with the value N of the compensating mass 16 about equals the product of the length L1 of the lever 7 with the value M of the mass of the slide 2.

The working of the device according to the invention is very simple and as follows.

Figure 5:
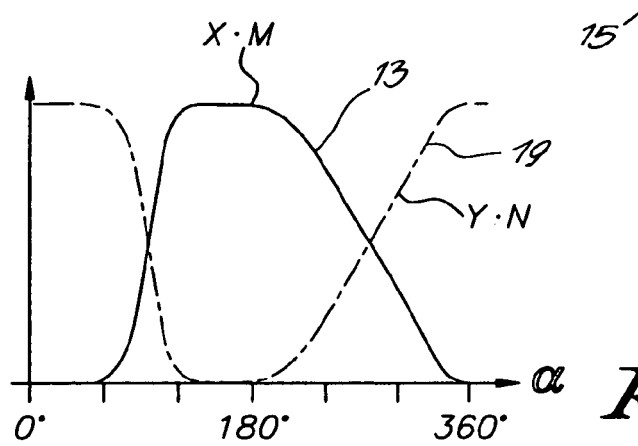
FIG. 5 represents a motion curve, as in FIG. 3, but for a tool as in FIG. 4.

When the driving shaft 6 is driven, the slide 2 is moved, as described above, according to the motion curve 13, as represented in FIG. 5, which is analogous to the motion curve 13 of FIG. 3.

When the slide 2 diverges to the left, the compensating mass 16 will diverge in the opposite sense to the right and vice versa.

In the sliding direction of the slide 2, the movements of the slide 2 and of the compensating mass 16 will be in the opposite direction, as indicated in FIG. 5, whereby the curve 19 in the dashed line represents the motion of the compensating mass 16, whereby Y represents the displacement of the compensating mass 16 in relation to for example its rightmost position.

For a professional, it will be ear that, thanks to the opposite movement of the slide 2 and of the compensating mass 16 and thanks to the dimensioning of the device 15, the vibrations in the direction of movement of the slide 2 will be remedied.

Figure 6:
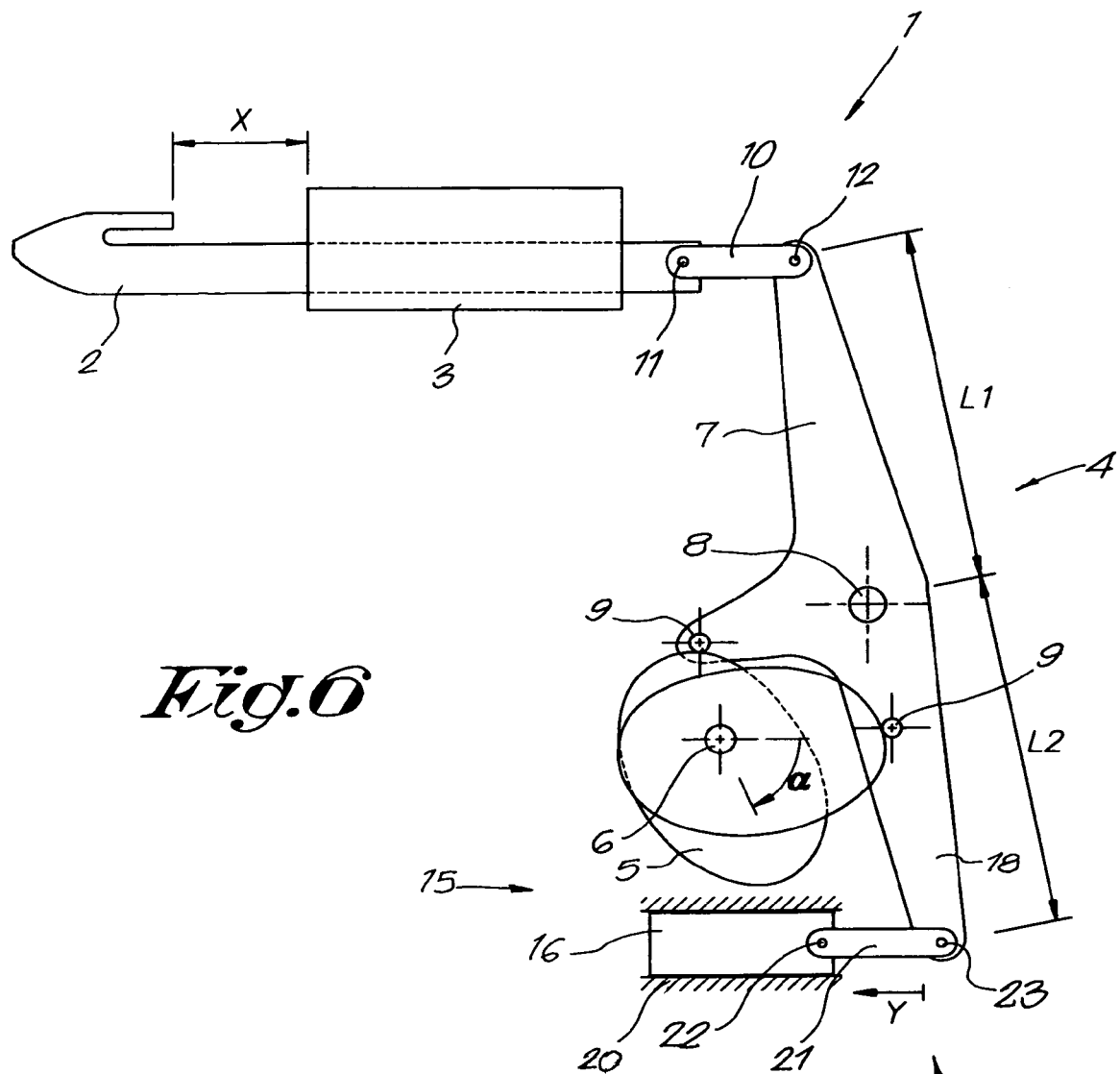
FIGS. 6 and 7 represent variants of FIG. 5.

FIG. 6 represents an embodiment of a tool 1 which is analogous to that of FIG. 5, but whereby the compensating mass 16 is not fixed directly to the far end of the extended part 17 in this case, but whereby the compensating mass 16 is provided in a sliding manner in a second guide 20 which is parallel, or almost parallel, to the above-mentioned first guide 3 of the slide 2.

The compensating mass 16 is connected to the free end of the extended part 18 of the lever 7 by means of a rod 21, whereby this rod 21 is hinge-mounted to its free ends by means of pins 22 and 23, to the compensating mass 16 and to the above-mentioned free end respectively.

The compensating mass 16 is in this case situated at a transverse pitch from the hinge pin 8 of the lever 7, which is about equal to the length L2 of the extended part 18 of this lever 7.

The working of the above-described variant is analogous to that of FIG. 4.

As the slide 2 and the compensating mass 16 move, in the case of a tool 1, as represented in FIGS. 4 and 6, in different planes, a moment of motion is created, however.

FIG. 7 again represents a tool 1, as in FIG. 1, which is in this case provided with a device 15 according to the invention which makes it possible to compensate the vibrations without creating an additional interfering moment of motion, as in the preceding variants.

In this case as well, a compensating mass 16 is applied which is provided in a sliding manner in a guide 20 which is situated in the extension, or practically in the extension, of the guide 3 of the slide 2.

The driving means 4 of the slide 2 and the means 17 for moving the compensating mass 16, are no longer formed of a common cam and lever mechanism in this case.

The means 17 for moving this compensating mass 16 are indeed formed of an additional separate cam and lever mechanism consisting of a compensation cam 24 on the driving shaft 6 and of a compensation lever 25 which is hinge-mounted on the hinge pin 8 of the lever 7 of the slide 2, which compensation lever 25 makes contact with the compensation cam 24 by means of catch pins 26 and which is connected to the compensating mass 16 by means of a rod transmission 27.

The mass N of the compensating mass 16 is in this case preferably equal to the mass M of the slide 2, whereas the contour form of the compensation cam 24 is selected such that the slide 2 and the compensating mass 16 move in opposite directions.

Figure 8:
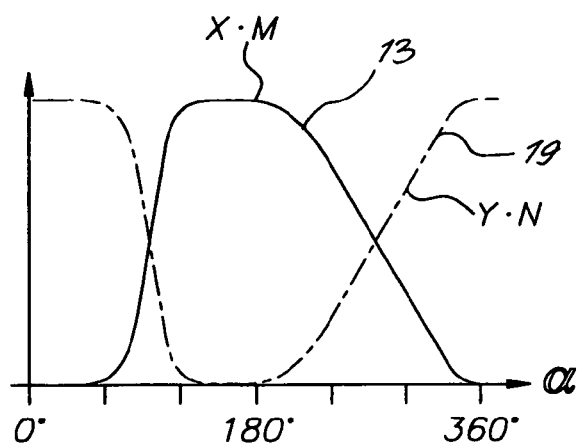
FIG. 8 represents a motion curve for the variant of FIG. 7.

The motion curves 13 and 19 of the slide 2 and of the compensating mass 16 are represented in FIG. 8, which makes ear that the vibrations of the slide 2 are remedied by the movements of the compensating mass 16.

Moreover, the movements of slide 2 and of the compensating mass 16 follow the same direction, such that no additional moment of motion is created.

It is clear that the compensation weight 16 can be fixed, if necessary, directly to the free end of the lever 25, instead of providing this mass in a guide.

Figure 9:
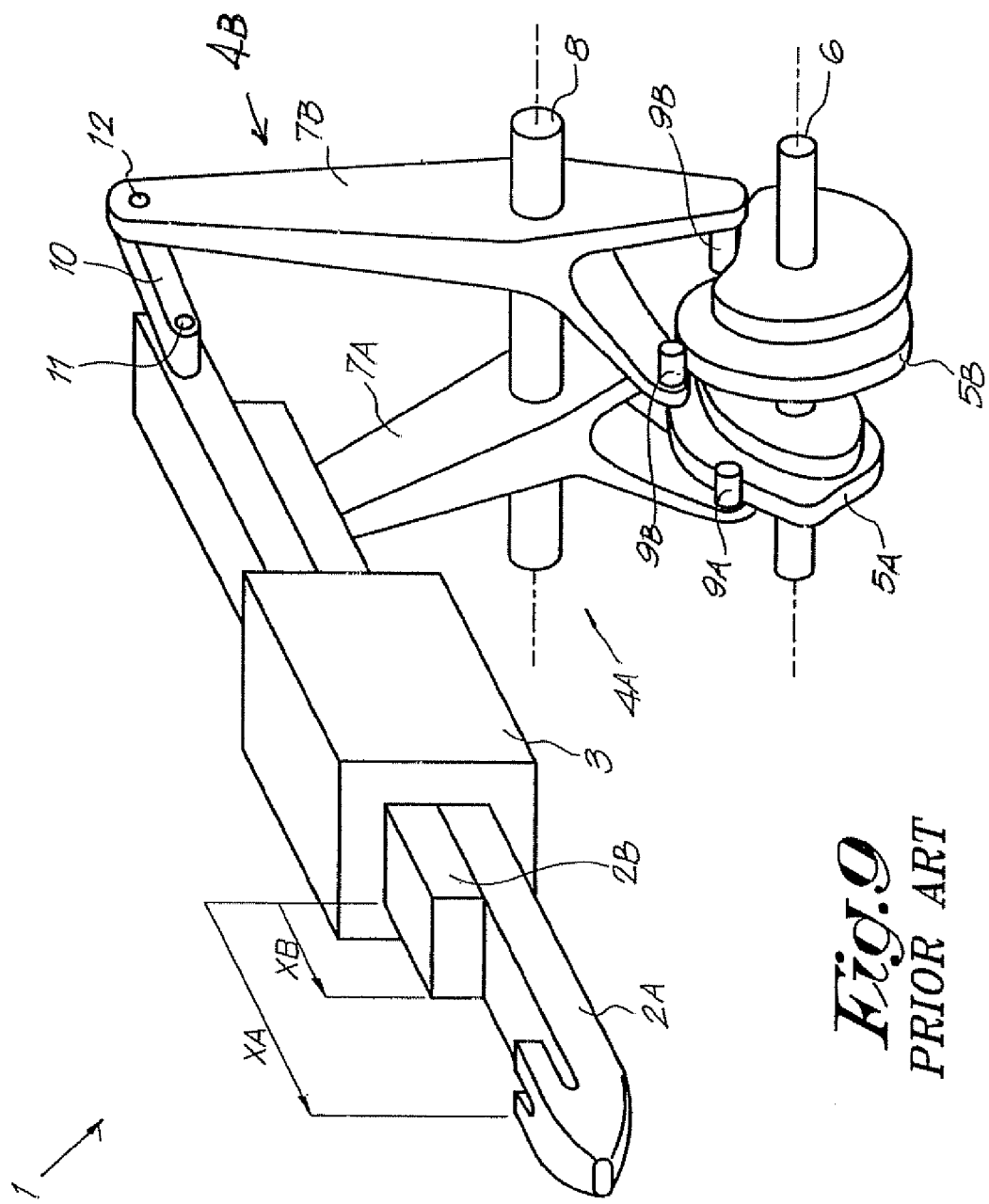
FIG. 9 represents a known variant of a tool according to FIG. 1, but with two slides.

FIG. 9 represents a variant of a known tool which is provided in this case with two slides moving independently from each other, 2A and 2B respectively, each having a respective mass MA and MB, which are provided in a sliding manner in a guide 3.

Each of these slides 2A and 2B is provided with its own drive means 4A and 4B, each in the shape of a cam and lever mechanism, 5A-7A and 5B-7B respectively.

Figure 10:
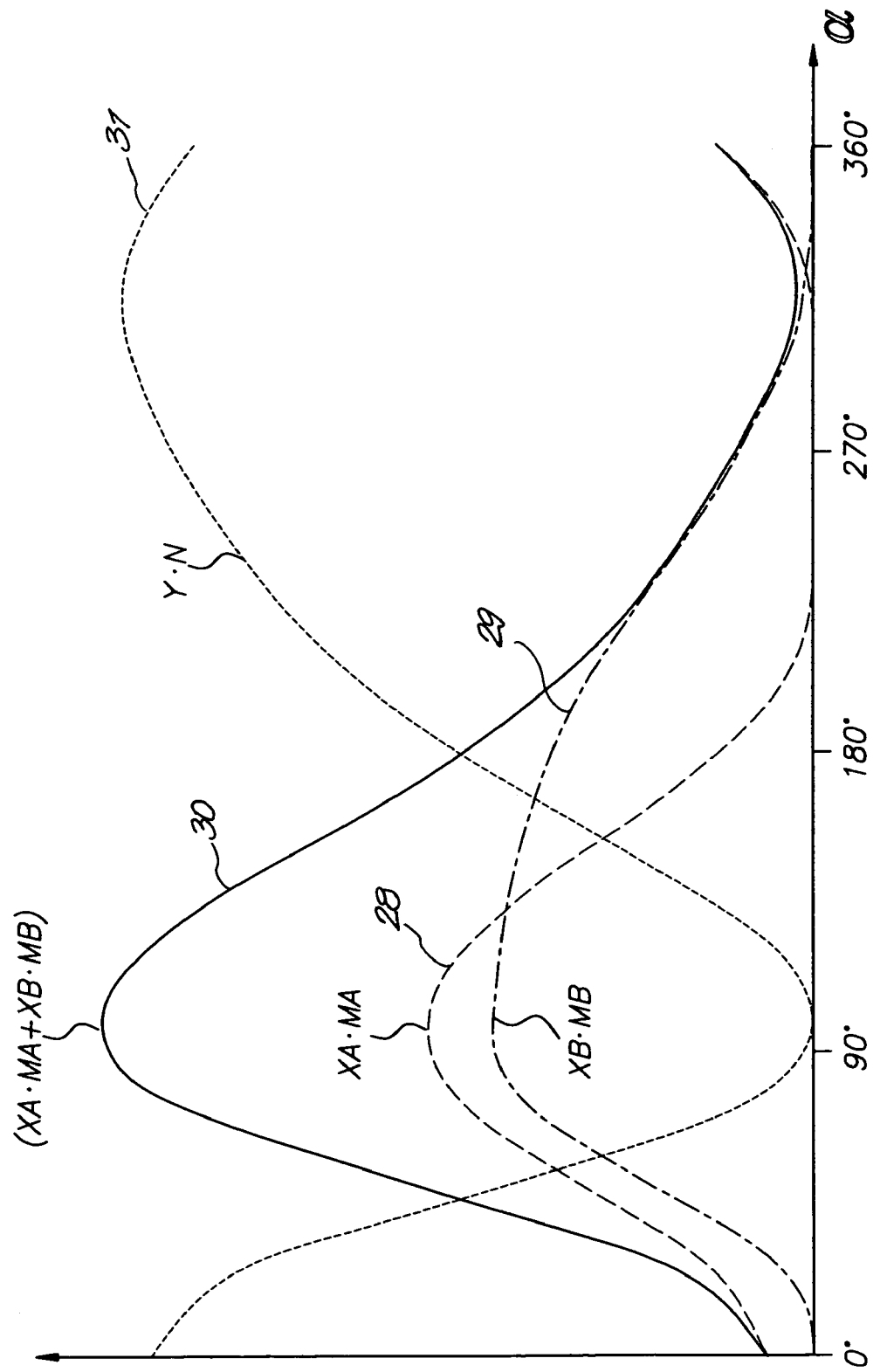
FIG. 10 represents the motion curve of the moving parts of the tool of FIG. 9.

FIG. 10 represents the motion curves 28 and 29, of both slides 2A and 2B respectively, as well as the superposed curve 30 which is the sum of the curves 28 and 29 and which provides insight in the vibrations which are generated collectively by both slides 2A and 2B.

Figure 11:
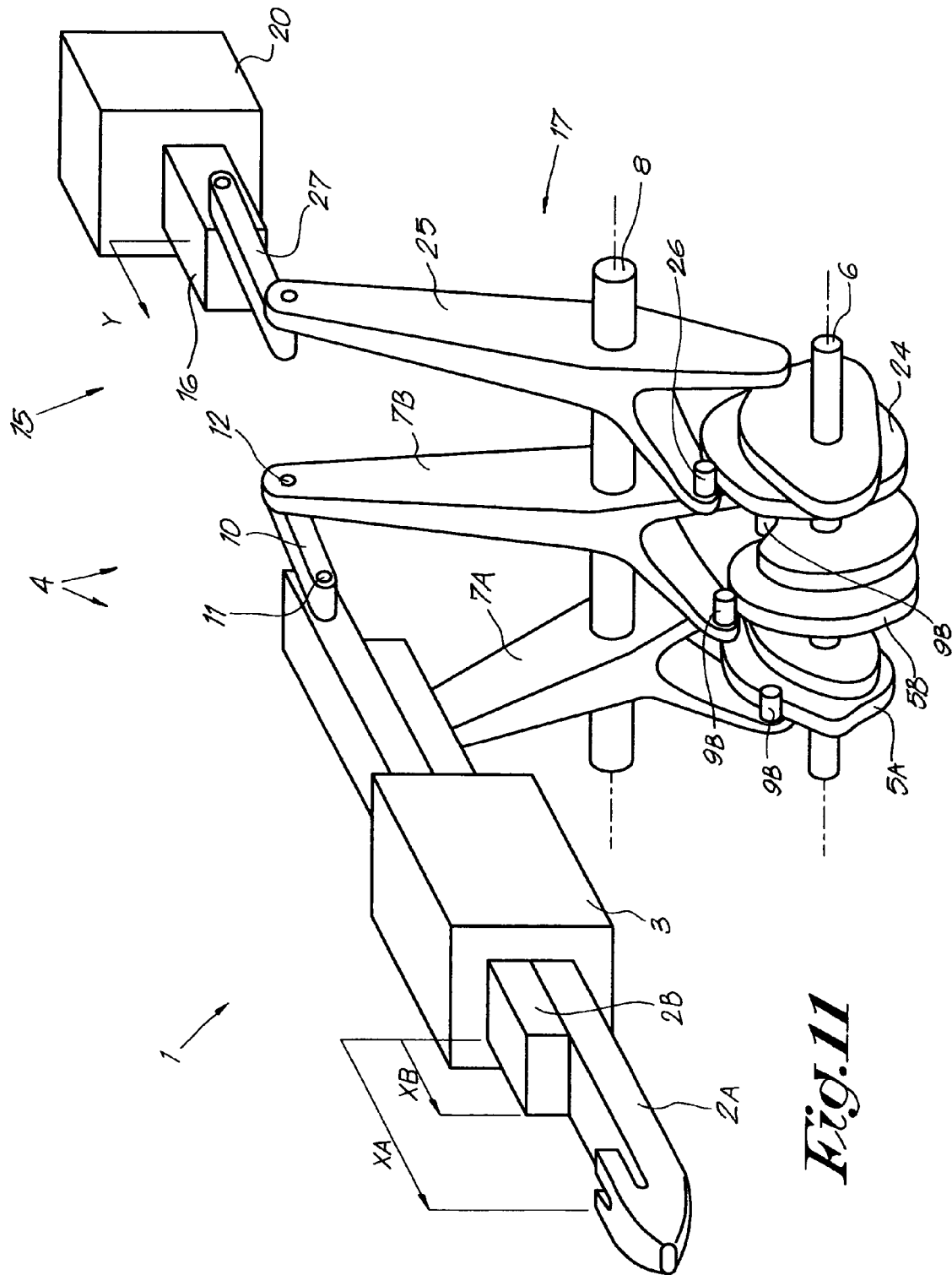
FIG. 11 represents a tool as in FIG. 9, but which is additionally equipped with a device according to the invention.

FIG. 11 represents such a tool of FIG. 10 with two slides 2A and 2B, which are in this case additionally equipped with a device 15 for compensating the vibrations caused by the movements of both slides 2A and 2B.

Figure 7:
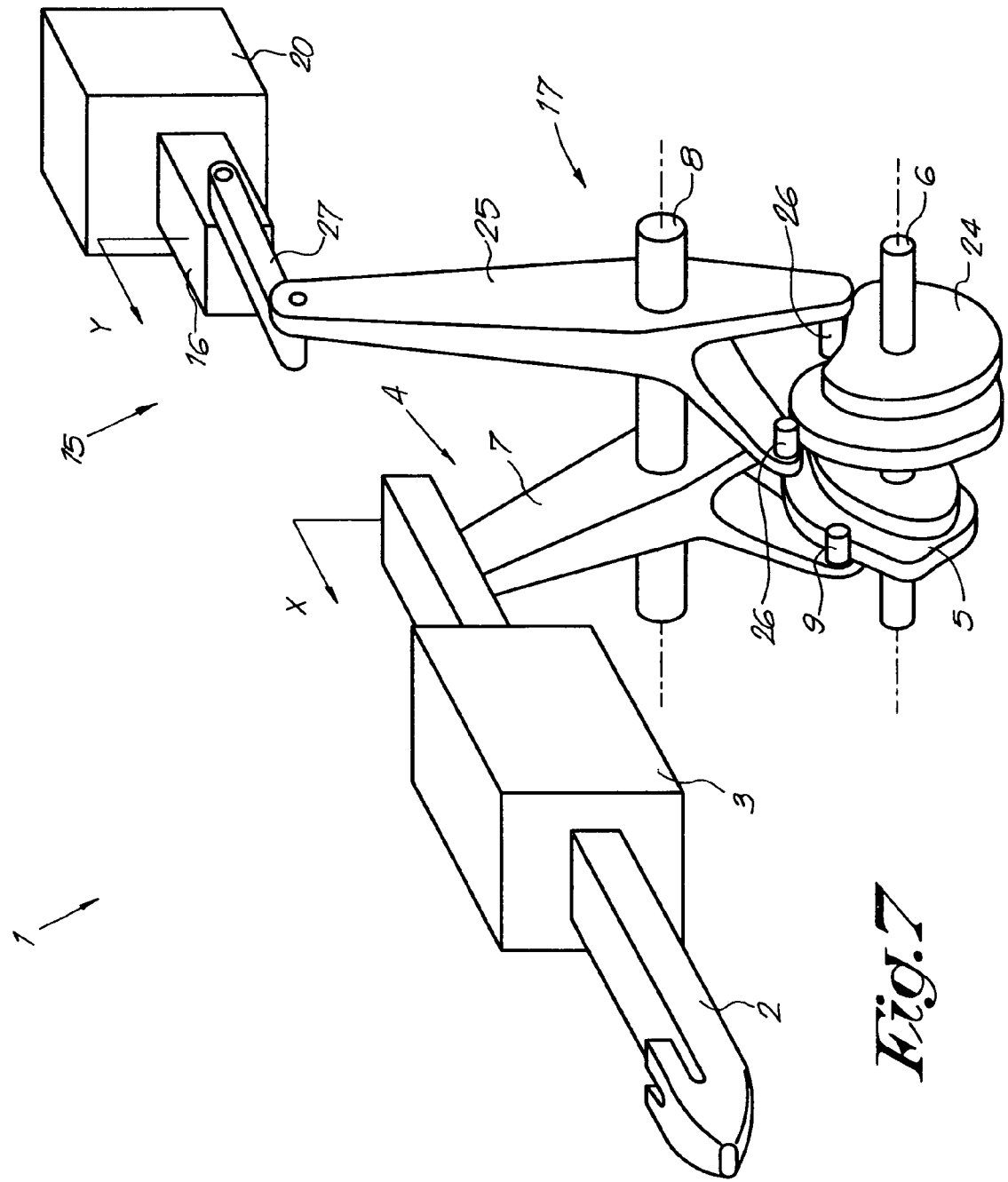

Said device 15 is in this case similar to the device 15 of FIG. 7 and is also formed in this case of a compensating mass 16 which is provided in a sliding manner in a guide 20 situated opposite the slides 2A and 2B, more particularly practically in the extension of these slides.

Means 17 are provided for moving the compensating mass 16 in the opposite direction of the weighted average movements of the slides 2A and 2B, taking into account the masses of each of these slides 2A and 2B, whereby these means are formed of an additional cam and lever mechanism 24-25.

The device 15 is dimensioned such that the motion curve 31 of the compensating mass 16 represented by means of a dashed line in FIG. 10, runs in the opposite direction of the superposed curve 30 of the two slides 2A and 2B.

In this manner, the vibrations of the slides 2A and 2B are remedied, without any additional moment of motion being generated.

Although in the figures, the movements of the slides 2, 2A and 2B, and of the compensating mass 16 are being driven by a cam and lever mechanism, other drives are not exuded.

Figure 12:
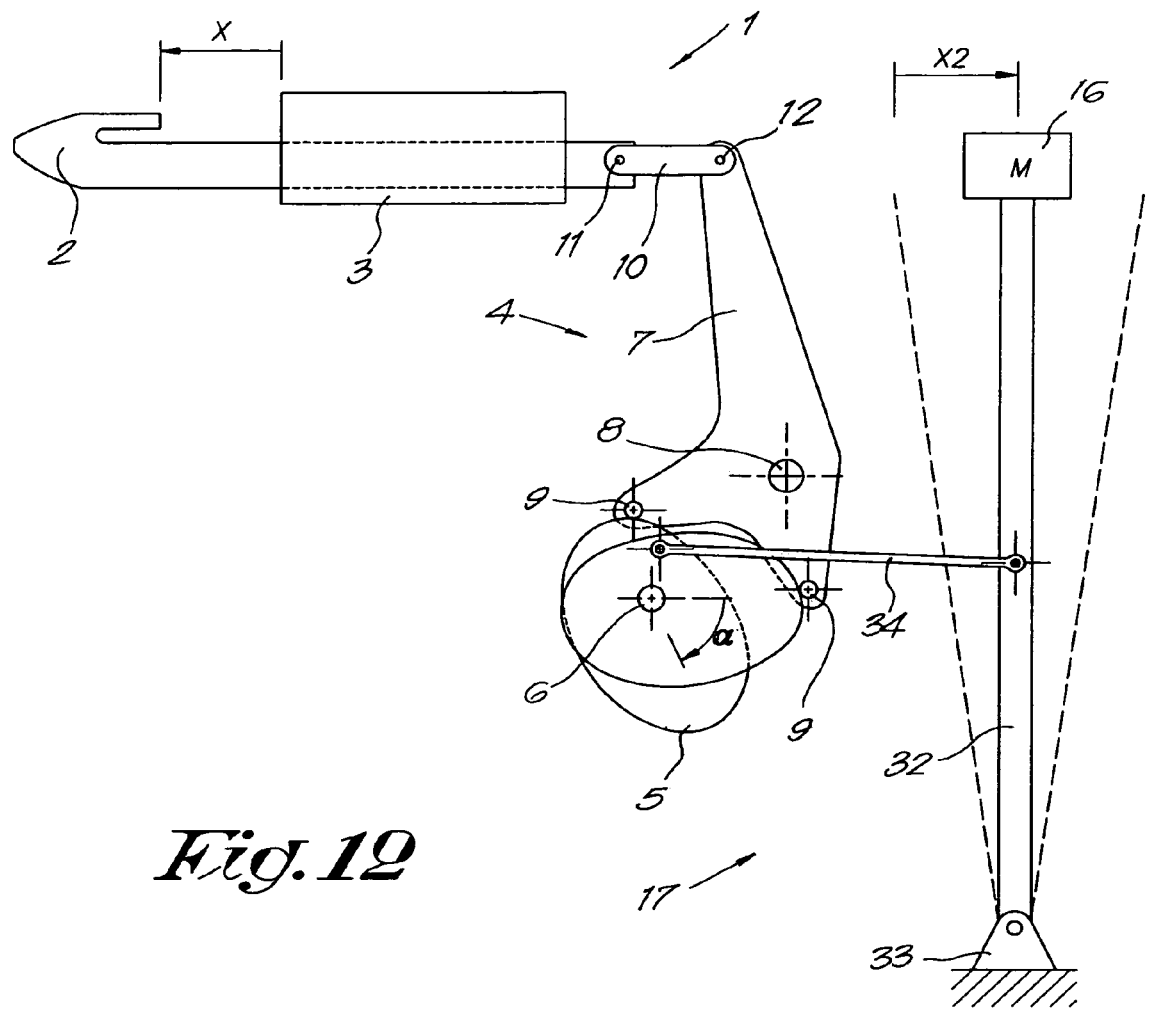
FIG. 12 represents a variant of FIG. 1, but equipped with a device according to the invention.

Thus, for example, FIG. 12 illustrates how the means 17 for moving the compensating mass 16 in the opposite direction of the slide 2 are formed of a rod 32 which is hinge-mounted on one far end to a support 33, and which is provided with the compensating mass 16, situated in the extension of the slide 2, on its other far end on the one hand, and of a connecting rod 34 which is hinge-mounted with one far end to the above-mentioned rod 32, at a point between the support 33 and the mass 16, and which is hinge-mounted in an eccentric manner with its other far end to the shaft 6 or to the cam 5 of the driving means 4 of the slide 2 on the other hand.

Figure 13:
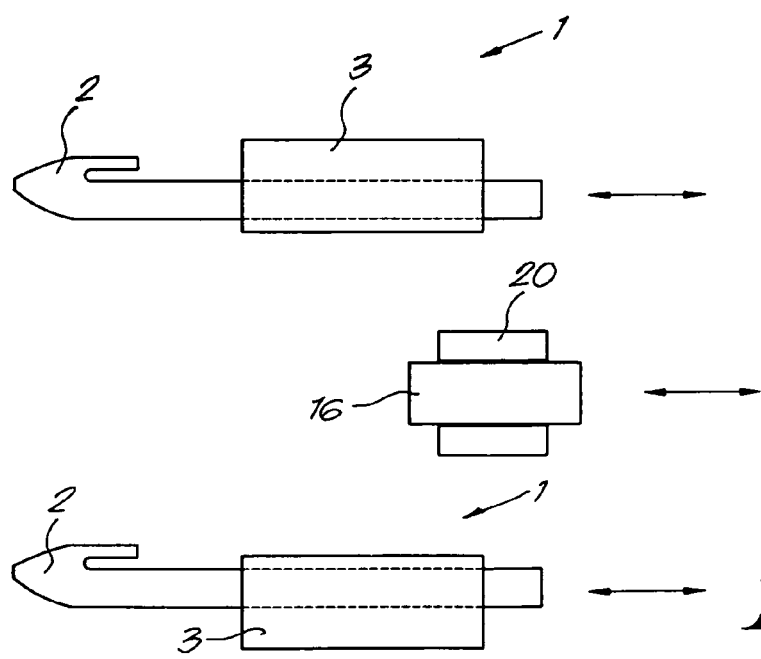
FIG. 13 represents a variant of a device according to the invention, applied to several tools.

FIG. 13 schematically represents how, in case of a machine with several tools 1 which each consist of at least one slide 2, the use of a single compensating mass 16 may suffice, and how it is preferably provided near the common centre of gravity of the slides 2 of the different tools 1.

It is clear that such a construction with one common compensating mass 16 is advantageous when the filling tools 1 are driven by cams on a common camshaft.

The present invention is by no means limited to the above-described embodiments given as an example and represented in the accompanying drawings; on the contrary, such a device according to the invention can be made in all sorts of shapes and dimensions while still remaining within the scope of the invention.

The invention claimed is:

1. A device for compensating the vibrations caused by the movements of a tool of a brush manufacturing machine including a tool having a first slide which is provided in a first guide such that the first slide is movable to and fro and which is provided with a first driving means for the first slide; a compensating mass and a mass moving device arranged to move the compensating mass; at least a second slide which is movable independently in the first guide by a second driving means; wherein the compensating mass is provided in a second guide located opposite said slides; said mass moving device arranged to move the compensating mass in the opposite sense of the weighted average movements of said slides.

2. The device according to claim 1, wherein said mass moving device comprises a cam and lever mechanism.

3. The device according to claim 1, wherein the compensating mass is disposed near the common centre of gravity of said slides.

* * * * *